3,342,863
N,N-DILOWER ALKYL AMINO ADAMANTANE OXIDES
Edward C. Hermann, Newark, Del., assignor to E. I. du Pont de Nemours and Company, Wilmington, Del., a corporation of Delaware
No Drawing. Filed Apr. 24, 1963, Ser. No. 275,244
8 Claims. (Cl. 260—563)

The invention relates to adamantane derivatives and more particularly to a class of dialkyl substituted amino adamantane oxide compounds useful as antiviral agents, and to their preparation and use.

I have discovered a narrow class of amine oxide derivatives of adamantane which has significant activity against virus infections. These amine oxide derivative compounds are characterized by a high level of antiviral effectiveness. Furthermore they exhibit favorable toxicity advantages, along with very satisfactory stability, absorption rates and compatibility with pharmaceutical adjuvants.

The compounds of this invention are also useful as intermediates in the preparation of 1-N-alkylaminoadamantanes, themselves useful as antiviral agents, antioxidants and the like.

The compounds within the scope of the present invention have the following structural formula:

(1) 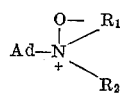

where Ad represents the saturated adamantane nucleus; $R_1$ and $R_2$ can be the same or different and each is an alkyl group of 1 through 12 carbon atoms, and preferably lower alkyl of 1 through 4 carbon atoms; and where $R_1$ and $R_2$ can be joined together to form a divalent alkylene group —$(CH_2)_n$— where $n$ is a positive integer of 2 through 6.

Thus $R_1$ and $R_2$ in the above formula can be methyl, ethyl, n-propyl, isopropyl, n-butyl, sec-butyl, tert-butyl and other straight and branched chain alkyl radicals such as amyl, hexyl, heptyl, octyl, nonyl and decyl. Methyl and ethyl are particularly preferred. When taken together $R_1$ and $R_2$ can be ethylene, propylene, butylene, amylene and hexylene groups.

The adamantane amine oxide compounds of this invention are colorless syrups or colorless crystalline solids. They are soluble in water, and are weak bases, forming salts with strong acids such as picric acid, perchloric acid, hydrochloric acid, hydrobromic acid, sulfuric acid, phosphoric acid, and the like.

They customarily exist as stable hydrates of varying water content. Although they can be dried to a reproducible content of water of hydration, the more drastic conditions for further removal of water cause decomposition.

The adamantane amine oxide compounds of this invention are readily obtained in good yields by reacting oxidizing agents such as hydrogen peroxide or perbenzoic acid with 1-N,N-dialkylaminoadamantanes. Water is usually used as a medium for the reaction with hydrogen peroxide. The reaction temperature can range from 0° C. or a little below, up to 100 degrees or so, but the reactions are usually run at room temperature.

Ordinarily, the use of one mole of hydrogen peroxide per mole of amine suffices but an excess of peroxide is advantageous and reduces the reaction time. In this case it is advisable to decompose any excess of hydrogen peroxide with platinum foil after the reaction is complete, to remove the possibility of forming an explosive concentration of hydrogen peroxide during subsequent concentration steps. The concentration of hydrogen peroxide in the reaction medium should be from 10 to 40% by weight, but concentrations from 3% to 90% can be used. In many instances, 30% hydrogen peroxide is best.

Economic considerations and a desire to avoid excess peroxide coupled with the need to have a fairly fluid reaction mixture, sometimes dictate the use of an inert diluent. In Example 1, for instance, one mole of 30% hydrogen peroxide is used per mole of amine, and the reaction is diluted with methanol. Methanol is an excellent solvent for this purpose. From this it will be understood that the term "inert" is used here in the sense that the reaction will proceed without the methanol, in 30% hydrogen peroxide alone. However, using methanol as a diluent, the reaction can be run mole-for-mole, and in homogeneous solution.

Perbenzoic acid is very sparingly soluble in water, although it turns liquid on contact with water. Thus it is advisable to run reactions with perbenzoic acid in an inert organic solvent. Benzene and toluene are good examples of inert solvents for this purpose. Diethyl ether, methanol, chloroform and carbon tetrachloride can also be used. Reaction temperatures like those for hydrogen peroxide are best, in the range of 0° C. to 100° C., and usually just at room temperature, but the reaction temperatures which are useful are really limited only by the freezing and boiling points of the solvent.

Using either hydrogen peroxide or perbenzoic acid, reaction times will depend on the temperatures used, but will generally be from ½ hour to 3 days. Reaction is usually complete in 2 days at room temperature. For manufacturing economy, this is easily cut to times of the order of 6 hours by running the reaction at 55° C.

The 1-N,N-dialkylaminoadamantane used as the starting material in preparing the compounds of this invention is readily obtainable, for example, by the following procedures:

(1) Reaction of 1-bromoadamantane, acetonitrile and concentrated sulfuric acid to give 1-acetamidoadamantane, followed by hydrolysis with sodium hydroxide to produce 1-aminoadamantane.

(2) This latter compound 1-aminoadamantane is reacted with an alkyl iodide in the presence of sodium bicarbonate to produce the corresponding 1-adamantyltrialkylammonium iodide.

(3) 1-adamantyltrialkylammonium iodide heated in 2-aminoethanol yields the desired 1-N,N-dialkylaminoadamantane.

The foregoing procedure for the synthesis of 1-N,N-dialkylaminoadamantane is described in detail in now abandoned copending application Serial No. 272,833, filed April 15, 1963, by Marvin Paulshock and John C. Watts and assigned to the same assignee as the present application. Illustrative information is now given herein for clarity and convenience:

A solution of 100 parts by weight of 1-bromoadamantane and 750 parts by weight of acetonitrile is stirred while about 270 parts by weight of concentrated sulfuric acid is added dropwise over a 2½ hour period. The resulting mixture is poured into 2500 parts by weight of cold water. The resulting precipitate is removed by filtration, washed with water and air dried to give essentially pure 1-actamidoadamantane.

This latter adamantane compound in an amount of 72 parts by weight, 150 parts by weight of pulverized sodium hydroxide, and 1500 parts by weight of diethylene glycol are heated together at 180° C. for about 48 hours. The mixture is cooled and poured into 3600 parts by weight of cold water. Extraction with ether and subsequent removal of the ether yields essentially pure 1-aminoadamantane.

A flask is charged with 15.1 grams (0.1 mole) of 1-aminoadamantane, 40 milliliters (90 grams, 0.64 mole) of methyl iodide, 25.2 grams (0.3 mole) of sodium bicarbonate and 150 milliliters of methanol. The mixture is stirred and refluxed overnight. 1-adamantyltrimethylammonium iodide is recovered by filtration and concentration.

A flask is charged with 12.8 grams (0.040 mole) of 1-adamantyltrimethylammonium iodide and 25 grams (0.40 mole) of 2-aminoethanol. The mixture is refluxed for 15 minutes, cooled and the cooled product poured into 100 milliliters of water. The mixture is extracted with ether, the extract dried with anhydrous potassium carbonate and the ether evaporated to yield as an oily residue 1-N,N-dimethylaminoadamantane.

Following the procedures just described one can readily prepare other 1-N,N-dialkyl substituted aminoadamantanes useful in the present invention by substituting like amounts of other appropriate alkyl iodides for the methyl iodide of the preceding exemplary description. Such description is given herein for purposes of illustration only and no unnecessary limitation is to be given thereto.

The mixed 1-N,N-dialkylaminoadamantanes used as the starting material in preparing the compounds of this invention are readily obtainable, for example, by the following procedures:

(1) Reaction of 1-bromoadamantane, an alkane nitrile, and concentrated sulfuric acid to give the 1-acylamidoadamantane.

(2) Reduction of the 1-acylamidoadamantane to the 1-N-alkylaminoadamantane with lithium aluminum hydride.

(3) Acylation of the 1-N-alkylaminoadamantane with an acyl halide in pyridine to give the 1-N-alkylacylamidoadamantane.

(4) Reduction of the 1-N-alkylacylamidoadamantane with lithium aluminum hydride to give the 1-N,N-dialkylaminoadamantane.

The foregoing procedure for the synthesis of 1-N,N-dialkylaminoadamantanes is described in detail in the copending application by Marvin Paulshock and John C. Watts referred to above. Illustrative information is now given herein for clarity and convenience:

A solution of 21.5 parts by weight of 1-bromoadamantane and 48 parts by weight of hexane nitrile is stirred while about 18 parts by weight of concentrated sulfuric acid is added dropwise. The mixture is stirred and warmed at 50° for two hours. Then it is poured into 200 parts by weight of ice-water. The mixture is extracted with dichloromethane, which is washed with water, dried with anhydrous magnesium sulfate, and evaporated, to leave essentially pure 1-hexanoylamidoadamantane.

This latter adamantane compound in an amount of 12.5 parts by weight is dissolved in 100 parts by weight of diethylene glycol, dimethyl ether, containing 3.8 parts by weight of lithium aluminum hydride, and the mixture is stirred and refluxed for two hours. The reaction mixture is cooled to room temperature, and the excess lithium aluminum hydride is destroyed by the dropwise addition of water. The product is distributed between diethyl ether and 10% sodium hydroxide. The ether extract is dried with anhydrous potassium carbonate, and evaporated. The residue is distilled to yield pure 1-N-hexylaminoadamantane, B.P. 97–98° C. at 0.02 millimeter.

This latter admantane compound in an amount of 10 parts by weight is dissolved in 40 parts by weight of dry pyridine, and 3.7 parts by weight of acetyl chloride is added dropwise. The mixture is stirred and heated at 60° C. for two hours, then cooled and poured into 400 parts by weight of water. Filtration, followed by drying gives essentially pure 1-N-hexylacetamidoadamantane.

This latter adamantane compound in an amount of 11 parts by weight is treated with lithium aluminum hydride as 1-hexanoylamidoadamantane was treated above, to give 1-(N-ethyl-N-hexylamino)adamantane.

The 1-cyclicalkylaminoadamantanes used as the starting material in preparing the compounds of this invention are readily obtainable, for example, by the following procedures:

(1) Reaction of 1-bromoadamantane, a cyclic lactam, and silver sulfate to give the N-[adamantyl-(1)]cyclic lactam.

(2) Reduction of the N-[adamantyl-(1)]cyclic lactam to the N-[adamantyl-(1)]alkyleneimine.

The foregoing procedure for the synthesis of N-adamantyl-(1)]alkyleneimines is also described in detail in the copending application by Marvin Paulshock and John C. Watts referred to above. Illustrative information is now given for clarity and convenience:

A solution of 43 parts by weight of 1-bromoadamantane in 60 parts by weight of pyrrolidine-2-one is heated at 40° C. while 62 parts by weight of silver sulfate is added. The mixture is stirred and slowly heated to 60° C., when a rapid rise in temperature to about 110° C. is observed, in spite of cold water-bath cooling. The temperature declines almost immediately, and the mixture is heated at 95° C. for two hours. The solids are filtered from the hot solution, and 50 parts by weight of water is added. After cooling, the mixture is extracted with diethyl ether, which is dried with anhydrous magnesium sulfate, and evaporated to yield essentially pure N-[adamantyl-(1)]pyrrolidine-2-one.

This latter compound in an amount of 12 parts by weight is treated with lithium aluminum hydride as 1-hexanoylamidoadamantane was treated above, to give N-[adamantyl-(1)]pyrrolidine.

The present invention will be further explained by the following illustrative examples:

EXAMPLE 1

1-N,N-dimethylaminoadamantane (0.1 mole), 0.1 mole of 30% hydrogen peroxide and 20 milliliters of methanol are mixed and allowed to stand for 2 days. Evaporation and recrystallization from toluene gives 14.2 grams (73%) yield of 1-N,N-dimethylaminoadamantane oxide crystals. After a second recrystallization from toluene the crystals are allowed to stand overnight at 80° C. with an oil pump.

*Analysis.*—Calcd. for $C_{12}H_{21}NO \cdot 2.2H_2O$: C, 61.35; H, 10.89; N, 5.96. Found: C, 61.48; H, 10.46; N, 6.14.

Attempts to dry the material further lead to decomposition. The proton nuclear magnetic resonance spectrum of the product is summarized in the following table:

| Assignment | Area Ratio | Tau Value | Splitting |
|---|---|---|---|
| $N(CH_3)_2$ | 6 | 6.72 | Singlet. |
| Beta-methine | 3 | 7.22 | Unresolved. |
| Alpha-methylene | 6 | 7.88 | Doublet. |
| Gamma-methylene | 6 | 8.28 | Triplet. |

The quaternary nature of the nitrogen is indicated by the position of the N-methyl protons. For example the position of the N-methyl protons in N,N-dimethyl-N-adamantylammonium iodide is 6.6 tau while in N,N-dimethylaminoadamantane the N-methyl protons are found at 7.83 tau.

The amine oxide also forms a picrate salt. The yellow picrate salt decomposes at 240° C. For analysis the sample is recrystallized from acetonitrile and dried at 100° C. with an oil pump.

*Analysis.*—Calcd. for $C_{12}H_{21}NO \cdot C_6H_3N_3O_7$: C, 50.94; H, 5.70. Found: C, 50.79; H, 5.91.

EXAMPLE 2

A solution of 0.1 mole of 1-N,N-diethylaminoadamantane (B.P. 64° C. at 0.02 mm.) and 0.1 mole of perbenzoic acid in 25 milliliters of benzene is heated at 50° C. for six hours, then cooled and extracted with 50 milliliters of water. The water layer is washed with 25 milliliters of benzene and concentrated in vacuo until traces of benzene are removed. Then, the aqueous solution is passed over a column of ion exchange resin Rexyn RG 3 (a weak base organic anion exchanger) to remove any residual benzoic acid, and the effluent is concentrated in vacuo to yield 1-N,N-diethylaminoadamantane oxide.

EXAMPLE 3

A solution of 0.1 mole of 1-(N-ethyl-N-hexyl)aminoadamantane in 30 milliliters of methanol is treated with 0.1 mole of 30% hydrogen peroxide as in Example 1 and worked up as in that example to give 1-(N-ethyl-N-hexyl) aminoadamantane oxide.

EXAMPLE 4

A solution of 0.1 mole of N-[adamantyl-(1)]pyrrolidine in 30 milliliters of methanol is treated with 0.1 mole of 30% hydrogen peroxide as in Example 1 and worked up as in that example to give N-[adamantyl-(1)]pyrrolidine oxide.

ADDITIONAL EXAMPLES

The procedures of the preceding examples can be repeated substituting similar amounts of other appropriately substituted aminoadamantanes to obtain the following corresponding indicated exemplary products of this invention:

Example Nos. and Products—

5—1-(N-butyl-N-methylamino)adamantane oxide
6—1-(N-octyl-N-isopropylamino)adamantane oxide
7—1-N,N-diisopropylaminoadamantane oxide
8—1-N,N-di-n-butylaminoadamantane oxide
9—1-N,N-didodecylaminoadamantane oxide
10—1-(N-ethyl-N-methylamino)adamantane oxide
11—1-(N-heptyl-N-methylamino)adamantane oxide
12—1-N,N-dioctylaminoadamantane oxide
13—1-N,N-diisobutylaminoadamantane oxide
14—1-(N-decyl-N-ethylamino)adamantane oxide
15—1-(N-isoamyl-N-methylamino)adamantane oxide
16—N-[adamantyl-(1)]azetindine oxide
17—N-[adamantyl-(1)]aziridine oxide The compounds of Formula 1 can be administered in the antiviral treatment according to this invention by any means that effects contact of the active ingredient compound of Formula 1 with the site of virus infection. It will be understood that this includes the site prior to infection setting in as well as after. For example, administration can be parenterally, that is subcutaneously, intravenously, intramuscularly, or intraperitoneally. Alternatively or concurrently, the compounds are effective on administration by the oral route. Since particularly effective against respiratory infections such as viral influenza and viral pneumonia, administration can be by vapor or spray through the mouth or nasal passages.

The compounds within the scope of this invention are valuable for viral prophylaxis, as well as for therapeutic treatment.

The dosage administered will be dependent upon the virus being treated, the age, health and weight of the recipient, the extent of infection, kind of concurrent treatment if any, frequency of treatment, and the nature of the effect desired. Generally, a daily dosage of active ingredient compound will be from about 1 to 50 milligrams per kilogram of body weight, although lower, such as 0.5 milligram, or higher amounts can be used. Ordinarily, from 1 to 20 and preferably 1 to 10 milligrams per kilogram per day, in one or more applications per day, is effective to obtain the desired result.

The active ingredient of Formula 1 can be employed in useful compositions according to the present invention in such dosage forms as tablets, capsules, powder packets, or liquid solutions, suspension, or elixirs, for oral administration, or liquid solutions for parenteral use, and in certain cases, suspensions for parenteral use (except intravenous). In such compositions the active ingredient will ordinarily always be present in an amount of at least 0.5% by weight based on the total weight of the composition and not more than 90% by weight.

Besides the active ingredient of Formula 1 the antiviral composition will contain a solid or liquid nontoxic pharmaceutical carrier for the active ingredient.

In one embodiment of a pharmaceutical composition of this invention, the solid carrier is a capsule which can be of the ordinary gelatin type. In the capsule will be from about 30–60% by weight of a compound of formula 1 and 70–40% of a carrier. In another embodiment, the active ingredient is tableted with or without adjuvants. In yet another embodiment, the active ingredient is put into powder packets and employed. These capsules, tablets and powders will generally constitute from about 5% to about 95% and preferably from 25% to 90% by weight. These dosage forms preferably contain from about 5 to about 500 milligrams of active ingredient, with from about 25 to about 250 most preferred.

The pharmaceutical carrier can, as previously indicated, be a sterile liquid such as water and oils, including those of petroleum, animal, vegetable or synthetic origin, for example peanut oil, soybean oil, mineral oil, sesame oil, and the like. In general, water, saline and aqueous dextrose (glucose) and related sugar solutions and glycols such as propylene glycol or polyethylene glycol are preferred liquid carriers, particularly for injectible solutions. Sterile injectible solutions such as saline will ordinarily contain from about 0.5 to 25%, and preferably about 1 to 10% by weight of the active ingredient.

As mentioned above, oral administration can be in a suitable suspension or syrup, in which the active ingredient ordinarily will constitute from about 0.5 to 10%, and preferably about 2 to 5%, by weight. The pharmaceutical carrier in such composition can be a watery vehicle such as an aromatic water, a syrup or a pharmaceutical mucilage.

Suitable pharmaceutical carriers are described in 'Remmington's Practice of Pharmacy" by E. W. Martin and E. F. Cook, a well-known reference text in this field.

In addition to the exemplary illustrations above, the following examples further explain the present invention:

EXAMPLE 18

A large number of unit capsules are prepared by filling standard two-piece hard gelatin capsules weighing about 50 milligrams each with 50 milligrams of powdered 1-N,N-dimethylaminoadamantane oxide, 125 milligrams of lactose and 1 milligram of "Cab-O-Sil." Oral administration of 2 such dosage units every four hours for 5 days effects satisfactory control of influenza.

EXAMPLE 19

Example 18 is repeated except that soft gelatin capsules are used and the adamantane oxide is first dissolved in polyethylene glycol 400, with equally satisfactory results.

EXAMPLE 20

Example 18 is repeated except that the dosage unit is 50 milligrams of active ingredient, 2.5 milligrams of gelatin, 1.5 milligrams of magnesium stearate and 100 milligrams of lactose, mixed and formed into a tablet by a conventional tableting machine. Equally satisfactory results are obtained. Slow release pills or tablets can also be used, by applying appropriate coatings.

EXAMPLE 21

A parenteral composition suitable for administration by injection is prepared by stirring 5% by weight of the active ingredient of Example 18 in sterile aqueous 0.9% saline.

A large variety of compositions according to this invention can thus readily be made by substituting other compounds of this invention, and including specifically but not limited to compounds of this invention that have specifically been named hereinbefore. The compounds will be used in the amounts indicated in accordance with procedures well known and described in the Martin and Cook text mentioned above.

The compounds of this invention are particularly effective against swine influenza. An important embodiment of this invention therefore is the control of this infection by incorporating an active ingredient compound in the diet of the affected animal. For most purposes, an amount of active compound will be used to provide from about 0.0001% to 0.1% by weight of the active compound based on the total weight of feed intake. Preferably, from 0.001% to 0.02% by weight will be used.

In a related aspect, novel and useful compositions are provided by this invention which comprise at least one active ingredient compound within the scope of this invention in admixture with an animal feed. Descriptions of suitable feeds can be found in the book "Feeds and Feeding" by Frank B. Morrison, published by the Morrison Publishing Company of Ithaca, New York, 1948, 21st edition. The selection of the particular feed is within the knowledge of the art and will depend of course on the animal, the economics, natural materials available, the surrounding circumstances and the nature of the effect desired, as will by readily understood.

Particularly important composition according to this feature of the invention is a concentrate, suitable for preparation and sale to a farmer or livestock grower for addition to the animal's feedstuffs in appropriate proportion. These concentrates ordinarily comprise about 50% to about 95% by weight of the active ingredient compound together with a finely divided solid, preferably flours, such as wheat, corn, soya bean and cottonseed. Depending on the recipient animal, the solid adjuvant can be ground cereal, charcoal, fuller's earth, oyster shell and the like. Finely divided attapulgite and bentonite can be used, these latter materials also acting as solid dispersing agents.

The feed compositions, as well as the just-described concentrates, can additionally contain other components of feed concentrates or animal feeds, as will be readily understood. Other particularly important additives include proteins, carbohydrates, fats, vitamins, minerals, antibiotics, etc.

The following example will further illustrate this aspect of this invention:

EXAMPLE 22

A feed for pigs is prepared as follows:

| | Pounds |
|---|---|
| Oat Groats | 350 |
| Yellow corn, ground | 1000 |
| Molasses | 100 |
| Soybean meal | 450 |
| Dried skim milk | 100 |
| Ground limestone | 20 |
| Dicalcium phosphate | 20 |
| Salt plus trace mineral mix | 10 |
| Standard vitamin premix | 1 |
| | 2051 |

An epidemic of swine influenza in a pig herd is halted by adding to the pigs' diet a concentrate of 50% of 1-N,N-diethylaminoadamantane oxide as the active ingredient and 50% by weight corn flour, in an amount that provides 0.015% by weight of the active ingredient based on the total diet.

The above and similar examples can be carried out in accordance with the teachings of this invention, as will be readily understood by persons skilled in the art, by substitution of components and amounts in place of those specified. Thus, the foregoing detailed description has been given for clearness of understanding only and no unnecessary limitations are to be understood therefrom.

The invention claimed is:

1. A compound of the formula

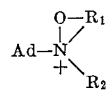

where Ad is the adamantyl nucleus and $R_1$ and $R_2$ are each alkyl of 1 through 12 carbon atoms; and where $R_1$ and $R_2$ can be joined to form a divalent group of the formula $-(CH_2)_n-$ where $n$ is an integer of 2 through 6.

2. A compound as set forth in claim 1 wherein $R_1$ and $R_2$ are lower alkyl.
3. 1-N,N-dimethylaminoadamantane oxide.
4. 1-N,N-diethylaminoadamantane oxide.
5. 1-(N-ethyl-N-methylamino)adamantane oxide.
6. 1-N,N-di-n-propylaminoadamantane oxide.
7. 1-N,N-diisopropylaminoadamantane oxide.
8. 1-N,N-di-n-butylaminoadamantane oxide.

References Cited

UNITED STATES PATENTS

| | | | |
|---|---|---|---|
| 2,169,976 | 8/1930 | Guenther et al. | 260—563 X |
| 2,220,835 | 11/1940 | Bruson et al. | 260—563 X |
| 2,871,229 | 1/1959 | Price | 260—563 X |
| 3,035,980 | 5/1962 | Tint | 167—78 |
| 3,040,096 | 6/1962 | Smith | 260—563 |
| 3,048,524 | 8/1962 | Bass | 167—78 |
| 3,069,468 | 12/1962 | Cox | 260—563 |

OTHER REFERENCES

Houben-Weyl, "Methoden der Organischen Chemie," vol. 11/2, pp. 190–199 (1958).

Rodd, "Chemistry of Carbon Compounds," vol. III^A, p. 176 (1954).

N. V. Sidgwick, The Organic Chemistry of Nitrogen (1937), pp. 25 and 165.

CHARLES B. PARKER, *Primary Examiner.*

FRANK CACCIAPAGLIA, JR., *Examiner.*

F. HIGEL, S. ROSEN, *Assistant Examiners.*